(12) United States Patent
Glebov et al.

(10) Patent No.: US 11,933,626 B2
(45) Date of Patent: Mar. 19, 2024

(54) NAVIGATION SYSTEM WITH VEHICLE POSITION MECHANISM AND METHOD OF OPERATION THEREOF

(71) Applicant: Telenav, Inc., Santa Clara, CA (US)

(72) Inventors: Alexander G. Glebov, San Jose, CA (US); Manuj Shinkar, Sunnyvale, CA (US); Kok Wei Koh, Mountain View, CA (US); Gregory Stewart Aist, Santa Clara, CA (US); HaiPing Jin, Saratoga, CA (US); Sarvesh Bansilal Devi, Milpitas, CA (US); Shalu Grover, Sunnyvale, CA (US); Jinghai Ren, Milpitas, CA (US); Yi-Chung Chao, San Jose, CA (US)

(73) Assignee: Telenav, Inc., Santa Clara, CA (US)

( * ) Notice: Subject to any disclaimer, the term of this patent is extended or adjusted under 35 U.S.C. 154(b) by 219 days.

(21) Appl. No.: 16/172,569

(22) Filed: Oct. 26, 2018

(65) Prior Publication Data
US 2020/0132497 A1 Apr. 30, 2020

(51) Int. Cl.
*G01C 21/36* (2006.01)
*G07C 5/00* (2006.01)
*G01C 21/16* (2006.01)
*G05D 1/00* (2006.01)
*G08G 1/16* (2006.01)
(Continued)

(52) U.S. Cl.
CPC ......... *G01C 21/3658* (2013.01); *G01C 21/16* (2013.01); *G01C 21/3602* (2013.01); *G05D 1/0088* (2013.01); *G06F 16/29* (2019.01); *G06V 20/588* (2022.01); *G07C 5/008* (2013.01); *G08G 1/167* (2013.01); *G05D 2201/0213* (2013.01)

(58) Field of Classification Search
None
See application file for complete search history.

(56) References Cited

U.S. PATENT DOCUMENTS 9,399,397 B2 * 7/2016 Mizutani ................ B60K 31/00
10,595,176 B1 * 3/2020 Gallagher .............. G08G 1/163
(Continued)

OTHER PUBLICATIONS

Hsu-Yung Cheng, et al. "Lane Detection With Moving Vehicle in the Traffic Scenes", Dec. 2006, IEEE Transactions on intelligent transportation systems, vol. 7, No. 4, pp. 571-582 (Year: 2006).*
(Continued)

*Primary Examiner* — Hongye Liang
(74) *Attorney, Agent, or Firm* — Perspectives Law Group, Corp.

(57) ABSTRACT

A navigation system includes: a communication unit configured to receive vehicle environment information of a user vehicle, the vehicle environment information including proximate vehicle information representing proximately located vehicles relative to the user vehicle; and a control unit, coupled to the communication unit, configured to: determine lane reference vehicles from the proximately located vehicles based on a vehicle type of the proximately located vehicles; monitor the relative location of the lane reference vehicles; generate a road lane model including a lane delineation estimation based on the relative location of the lane reference vehicles; and calculate a lane position of the user vehicle according to the lane delineation estimation based on a lateral position shift of the user vehicle.

20 Claims, 5 Drawing Sheets

(51) Int. Cl.
G06F 16/29 (2019.01)
G06V 20/56 (2022.01)

(56) References Cited

U.S. PATENT DOCUMENTS

| | | | | |
|---|---|---|---|---|
| 2013/0128050 | A1* | 5/2013 | Aghdasi | G06T 7/292 |
| | | | | 348/158 |
| 2016/0129834 | A1* | 5/2016 | Lee | G08G 1/167 |
| | | | | 340/903 |
| 2018/0247138 | A1* | 8/2018 | Kang | G06V 10/776 |
| 2018/0297640 | A1* | 10/2018 | Fujii | B62D 6/04 |
| 2019/0185016 | A1* | 6/2019 | Terasawa | B60W 40/072 |
| 2020/0064846 | A1* | 2/2020 | Chen | G08G 1/096791 |

OTHER PUBLICATIONS

Heba Aly et al. "LaneQuest: An Accurate and Energy-Efficient Lane Detection System" (published in:) 2015 IEEE International Conference on Pervasive Computing and Communications (PerCom), Mar. 23, 2015.

Thanh-Son Dao et al. "Realtime Experiments in Markov-Based Lane Position Estimation Using Wireless Ad-Hoc Network" (published in:) 2008 IEEE Intelligent Vehicles Symposium, Jun. 4, 2008, pp. 901 to 906.

Richard Matthaei et al. "Map-relative Localization in Lane-Level Maps for ADAS and Autonomous Driving" (published In:) 2014 IEEE Intelligent Vehicles Symposium Proceedings, Jun. 8, 2014.

Alex Davies "The Clever Way Ford's Self-Driving Cars Navigate in Snow" (published in:) Wired at "https://www.wired.com/2016/01/the-clever-way-fords-self-driving-cars-navigate-in-snow", Nov. 1, 2016.

* cited by examiner

NAVIGATION SYSTEM WITH VEHICLE POSITION MECHANISM AND METHOD OF OPERATION THEREOF

TECHNICAL FIELD

An embodiment of the present invention relates generally to a navigation system, and more particularly to a system for vehicle position estimation.

BACKGROUND

Modern consumer and industrial electronics, especially devices such as graphical navigation systems, cellular phones, and vehicle integrated navigation and computing systems, are providing increasing levels of functionality to support modern life, including navigation and route guidance services. Research and development in the existing technologies can take a myriad of different directions.

As users become more empowered with the growth of navigation devices and vehicle based navigation services, new and old paradigms begin to take advantage of this new device space. There are many technological solutions to take advantage of this new device capability to enhance or augment navigation and route guidance. However, users are often not provided with the ability to automatically determine a vehicle lane position while using a vehicle during various road conditions.

Thus, a need still remains for a navigation system with a vehicle position estimation mechanism for operator awareness while using a navigation system. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a navigation system, including: a communication unit configured to receive vehicle environment information of a user vehicle, the vehicle environment information including proximate vehicle information representing proximately located vehicles relative to the user vehicle; and a control unit, coupled to the communication unit, configured to: determine lane reference vehicles from the proximately located vehicles based on a vehicle type of the proximately located vehicles; monitor the relative position of the lane reference vehicles; generate a road lane model including a lane delineation estimation based on the relative position of the lane reference vehicles; and calculate a lane position of the user vehicle according to the lane delineation estimation based on a lateral position shift of the user vehicle.

An embodiment of the present invention provides a method of operation of a navigation system including: receiving vehicle environment information of a user vehicle, the vehicle environment information including proximate vehicle information representing proximately located vehicles relative to the user vehicle; determining lane reference vehicles from the proximately located vehicles based on a vehicle type of the proximately located vehicles; monitoring the relative position of the lane reference vehicles; generating a road lane model including a lane delineation estimation based on the relative position of the lane reference vehicles; and calculating a lane position of the user vehicle according to the lane delineation estimation based on a lateral position shift of the user vehicle.

An embodiment of the present invention provides a non-transitory computer readable medium including instructions executable by a control circuit for a navigation system, the instructions including: receiving vehicle environment information of a user vehicle, the vehicle environment information including proximate vehicle information representing proximately located vehicles relative to the user vehicle; determining lane reference vehicles from the proximately located vehicles based on a vehicle type of the proximately located vehicles; monitoring the relative position of the lane reference vehicles; generating a road lane model including a lane delineation estimation based on the relative position of the lane reference vehicles; and calculating a lane position of the user vehicle according to the lane delineation estimation based on a lateral position shift of the user vehicle.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
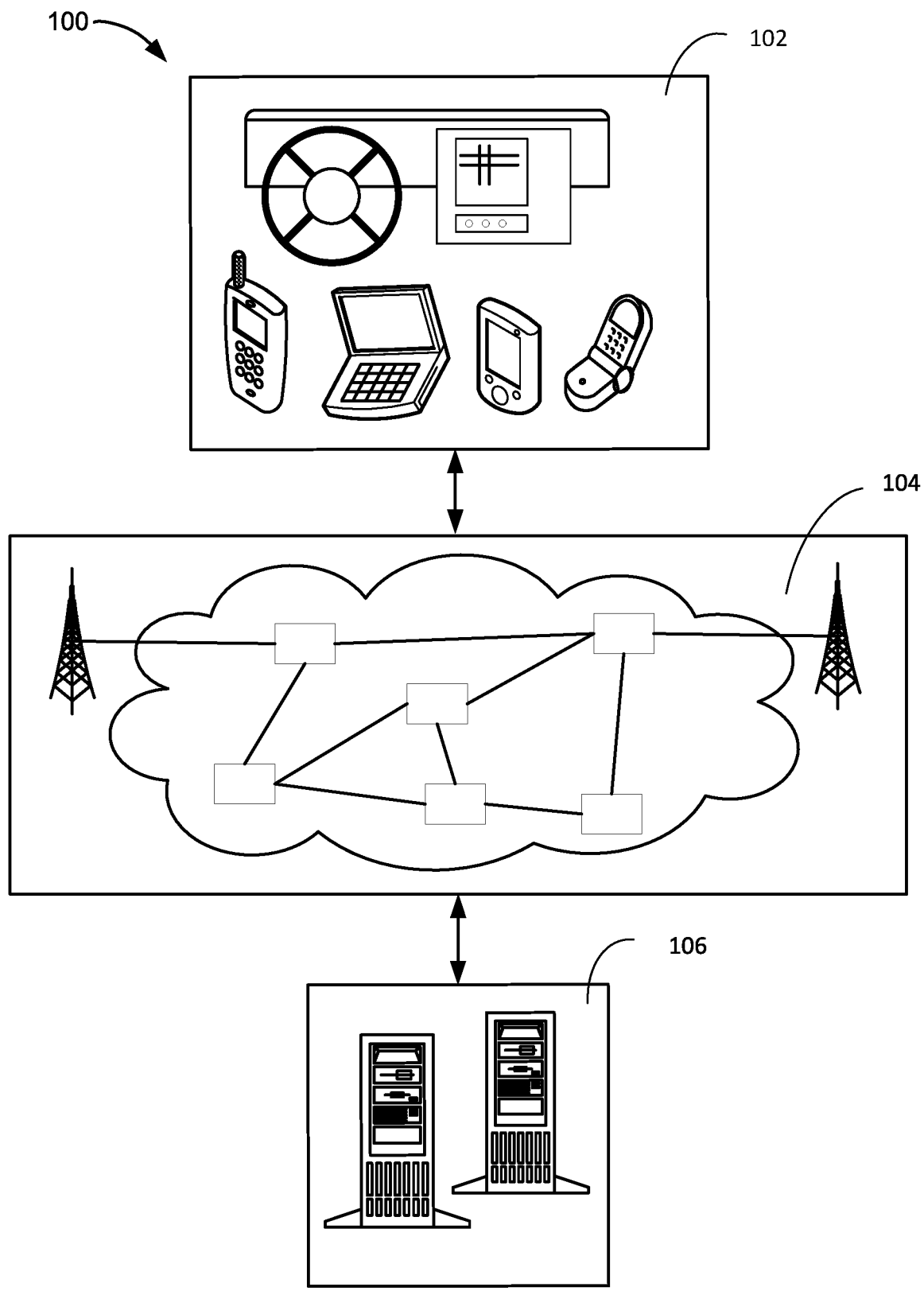
FIG. 1 is a navigation system with vehicle position estimation mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation.

The term "module" referred to herein can include software, hardware, or a combination thereof in an embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof. Further, if a module is written in the apparatus claims section below, the modules are deemed to include hardware circuitry for the purposes and the scope of apparatus claims.

The modules in the following description of the embodiments can be coupled to one other as described or as shown. The coupling can be direct or indirect without or with, respectively, intervening items between coupled items. The coupling can be physical contact or by communication between items.

Referring now to FIG. 1, therein is shown a navigation system 100 with vehicle position estimation mechanism in an embodiment of the present invention. The navigation system 100 includes a first device 102, such as a client or a server, connected to a second device 106, such as a client or server. The first device 102 can communicate with the second device 106 with a communication path 104, such as a wireless or wired network.

For example, the first device 102 can be of any of a variety of computing devices, such as a cellular phone, a tablet computer, a smart phone, a notebook computer, vehicle embedded navigation system, or computing device. The first device 102 can couple, either directly or indirectly, to the communication path 104 to communicate with the second device 106 or can be a stand-alone device.

The second device 106 can be any of a variety of centralized or decentralized computing devices, sensor devices to take measurements or record environmental information, such as sensor instruments, sensor equipment, or a sensor array. For example, the second device 106 can be a multimedia computer, a laptop computer, a desktop computer, grid-computing resources, a virtualized computer resource, cloud computing resource, routers, switches, peer-to-peer distributed computing devices, or a combination thereof.

The second device 106 can be mounted externally or internally to a vehicle, centralized in a single room or within a vehicle, distributed across different rooms, distributed across different geographical locations, embedded within a telecommunications network. The second device 106 can couple with the communication path 104 to communicate with the first device 102.

For illustrative purposes, the navigation system 100 is described with the second device 106 as a computing device, although it is understood that the second device 106 can be different types of devices, such as a standalone sensor or measurement device. Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can span and represent a variety of networks and network topologies. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104. Further, the communication path 104 can traverse a number of network topologies and distances. For example, the communication path 104 can include direct connection, personal area network (PAN), local area network (LAN), metropolitan area network (MAN), wide area network (WAN), or a combination thereof.

Figure 2:
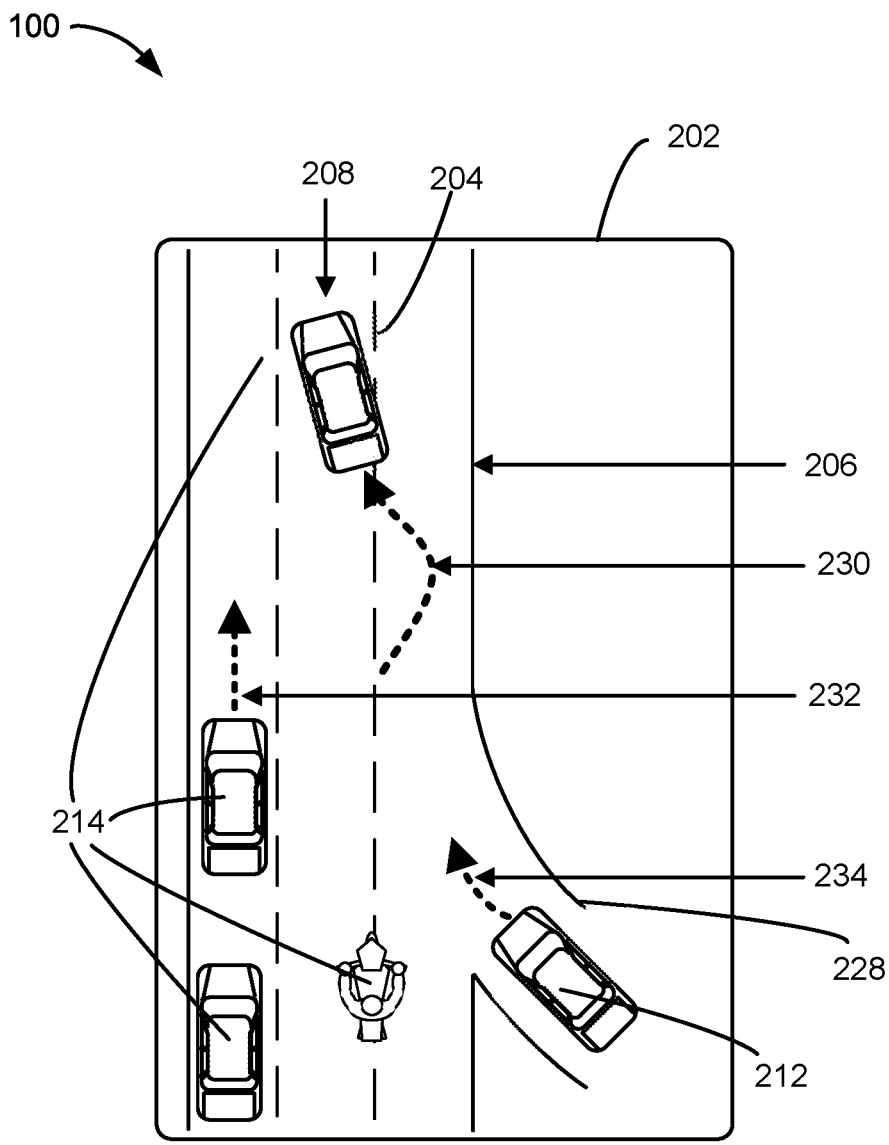
FIG. 2 is an example of a representation of a road lane model of the navigation system.

Referring now to FIG. 2, therein is shown a representation of a road lane model 202 of the navigation system 100. The road lane model 202 is an estimation of the lanes on a roadway. For example, the road lane model 202 can be localized to the geographic location around a user vehicle 212. The user vehicle 212 can be a vehicle occupied by the system user (not shown) of the first device 102, such as the occupant or operator of the user vehicle 212.

The road lane model 202 can include lane delineation estimations 204 for the lanes on a roadway relative to the location of a user vehicle 212. The lane delineation estimations 204 are estimations or approximations of lanes that divide vehicle traffic on the roadway. For example, the road lane model 202 can be localized to include the lane delineation estimations 204 for a current roadway 206, which is the roadway on which the user vehicle 212 is currently travelling. For example, the current roadway 206 can be a street, an alleyway, a highway, or unpaved path.

In general, the lane delineation estimations 204 can correspond with the actual lane delineations on the road. For example, reference objects in the environment around the user vehicle 212 can be used as a basis for alignment for the lane delineation estimations 204. The reference objects, for example, can include painted lane marking, raised pavement markers, reflective lane markers, traffic barriers, pylons, cones, flares, illuminators, other markings or features that indicate the existence of a traffic lane, or a combination thereof. As another example, the reference objects can include physical features of the roadway including gaps or edges between concrete or paved segments; metallic rails for trolleys or cable cars that embedded or integrated with the roadway; changes in or transitions between the road surface such as from an asphalt, concrete, or paved surface to a gravel or unpaved surface which generally exist along the edge of a roadway; or a combination thereof.

However, in certain situations, the reference objects in the environment around the user vehicle 212 may be unavailable or unreliable. For example, the reference objects can be unavailable because they are obscured or covered due to weather related phenomenon, such as snow, ice, flood waters, or mud. In another example, the reference objects can be unreliable as a reference for traffic flow in situations such as deviations or redirection from the reference objects due construction work or an accident.

In these situations where the reference objects are not used, the road lane model 202 can be based on proximately located vehicles 214 relative to the user vehicle 212. The proximately located vehicles 214 are vehicles within proximity to the user vehicle 212. For example, the proximately located vehicles 214 can be a vehicle that is within a specific range or distance of the user vehicle 212. An example of the specific range can be a predetermined value, such as within 100 or 1,000 feet, or a distance determined by the user or manufacture of the user vehicle 212. In another example, the specific range or distance can be based on limitations of sensors used to detect the proximately located vehicles 214.

As an example, the road lane model 202 can be generated with the lane delineation estimations 204 calculated based on information about selected instances of the proximately located vehicles 214. Examples of the information about the proximately located vehicles 214 can include a relative location, which is the position of the proximately located vehicles 214 relative to the user vehicle 212; a relative distance, which is the distance between the proximately located vehicles 214 and the user vehicle 212; a vehicle trajectory of the proximately located vehicles 214, such as the cardinal direction the proximately located vehicles 214 is traveling; a vehicle type of the proximately located vehicles 214; a motion pattern of the proximately located vehicles 214; or a combination thereof.

The vehicle type is a general category or classification of a vehicle. For example, the vehicle type can be general category of vehicle such as a bicycle, a motorized scooter, a motorcycle, a car, truck, a sport utility vehicle, a van, a bus, a recreational camper vehicle, a tractor trailer, or a construction vehicle. To further the example, the vehicle type can include specific classifications, such as emergency vehicles, which can be further distinguished as police vehicles, fire fighting vehicles, or medical response vehicles.

The motion pattern is a pattern of movement or maneuvering of a vehicle over a period of time. For example, the motion pattern can be a swerving motion 230, steady or continuous trajectory motion 232, or a turning motion 234, each as illustrated by the dotted line arrows.

The selected instances of the proximately located vehicles 214 can be used as a guide or reference to generate the lane delineation estimations 204 for the of the road lane model 202. Details regarding generation of the road lane model 202 will be discussed below.

The road lane model 202 can be used by the navigation system 100 to determine a lane position 208 of the user vehicle 212 on the current roadway 206. The lane position 208 identifies the lane of the current roadway 206 in which the user vehicle 212 is located.

In general, the navigation system 100 can determine the lane position 208 based on an initial point of entry of the user vehicle 212 onto the current roadway 206. For example, the lane position 208 can be based on a measurement of the number and direction of lateral shifts in position along the current roadway 206 the user vehicle 212 has made since entry onto the current roadway 206. Details for calculating the lane position 208 of the user vehicle 212 based on the road lane model 202 will be discussed below.

For illustrative purposes, the initial point of entry is depicted as a lane merge section 228. The lane merge section 228 are sections of the current roadway 206 where two or more instances of the roadway lane merge into a single instance of the roadway lane. As an example, the lane merge section 228 can follow a highway on-ramp or off-ramp, an intersection with other roadways, instances or types of the current roadway 206, or an exit from a vehicle parking area.

The road lane model 202 can be used by the navigation system 100 to operate the user vehicle 212. For example, the navigation system 100 can use the road lane model 202 to maintain or change the lane position 208 during autonomous operation of the user vehicle 212. Details regarding the autonomous operation of the user vehicle 212 will be discussed below.

Figure 3:
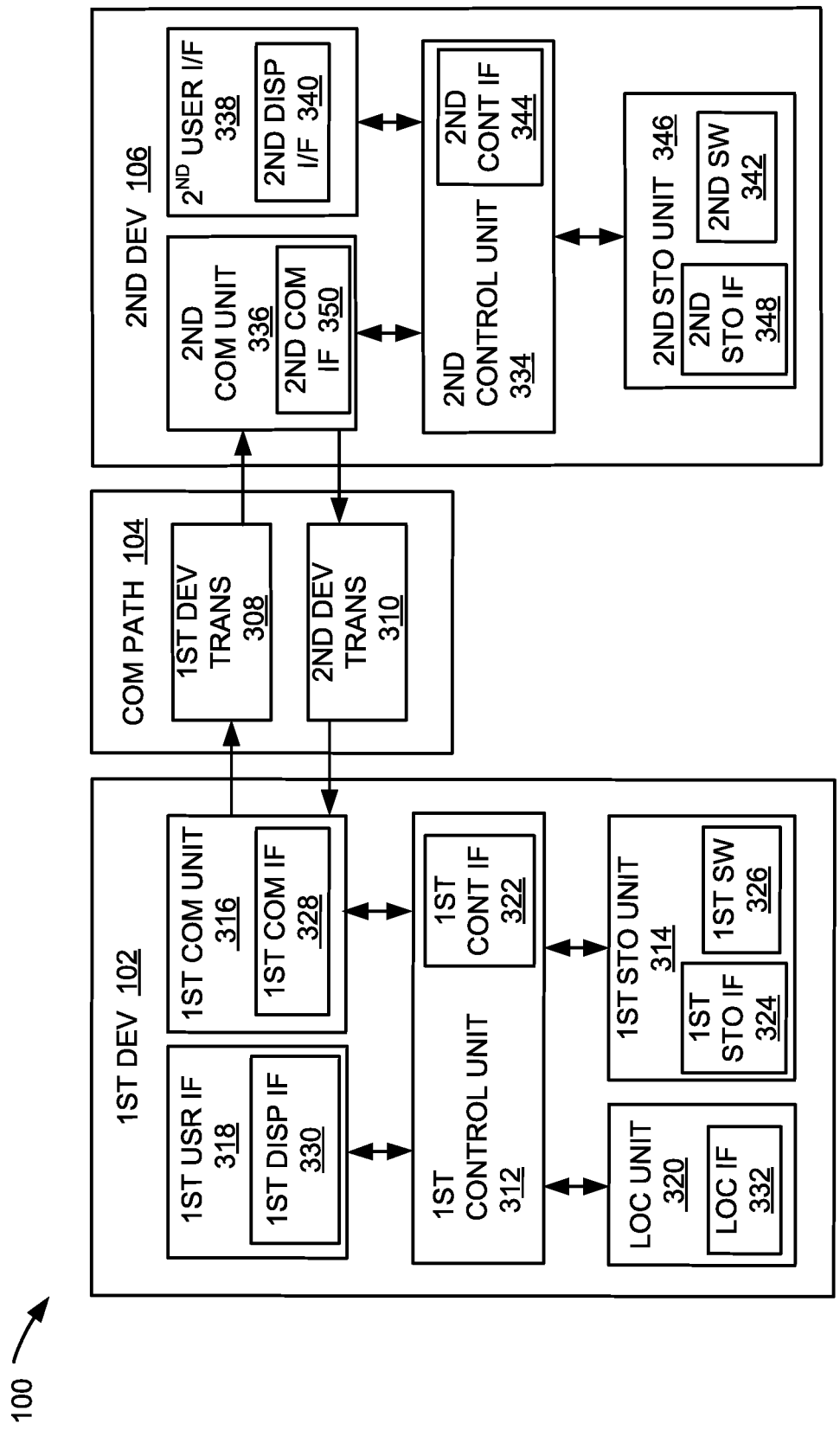
FIG. 3 is an exemplary block diagram of the navigation system.

Referring now to FIG. 3, therein is shown an exemplary block diagram of the navigation system 100. The navigation system 100 can include the first device 102, the communication path 104, and the second device 106. The first device 102 can send information in a first device transmission 308 over the communication path 104 to the second device 106. The second device 106 can send information in a second device transmission 310 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server having a display interface.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control unit 312, a first storage unit 314, a first communication unit 316, a first user interface 318, and location unit 320. The first control unit 312 can include a first control interface 322. The first control unit 312 can execute a first software 326 to provide the intelligence of the navigation system 100.

The first control unit 312 can be implemented in a number of different manners. For example, the first control unit 312 can be a processor, an application specific integrated circuit (ASIC) an embedded processor, a microprocessor, a hardware control logic, a hardware finite state machine (FSM), a digital signal processor (DSP), or a combination thereof. The first control interface 322 can be used for communication between the first control unit 312 and other functional units in the first device 102. The first control interface 322 can also be used for communication that is external to the first device 102.

The first control interface 322 can receive information from the other functional units or from external sources, or can transmit information to the other functional units or to external destinations. The external sources and the external destinations refer to sources and destinations external to the first device 102.

The first control interface 322 can be implemented in different ways and can include different implementations depending on which functional units or external units are being interfaced with the first control interface 322. For example, the first control interface 322 can be implemented with a pressure sensor, an inertial sensor, a microelectromechanical system (MEMS), optical circuitry, waveguides, wireless circuitry, wireline circuitry, or a combination thereof.

The location unit 320 can generate location information, current heading, and current speed of the first device 102, as examples. The location unit 320 can be implemented in many ways. For example, the location unit 320 can function as at least a part of a global positioning system (GPS) such as a GPS receiver, an inertial navigation system, a cellular-tower location system, a pressure location system, or any combination thereof.

The location unit 320 can include a location interface 332. The location interface 332 can be used for communication between the location unit 320 and other functional units in the first device 102. The location interface 332 can also be used for communication that is external to the first device 102.

The location interface 332 can receive information from the other functional units or from external sources, or can transmit information to the other functional units or to external destinations. The external sources and the external destinations refer to sources and destinations physically separate from the first device 102.

The location interface 332 can include different implementations depending on which functional units or external units are being interfaced with the location unit 320. The location interface 332 can be implemented with technologies and techniques similar to the implementation of the first control interface 322.

The first storage unit 314 can store the first software 326. The first storage unit 314 can also store the relevant information. For example, first storage unit 314 can store information such as the road lane model 202 of FIG. 2.

The first storage unit 314 can be a volatile memory, a nonvolatile memory, an internal memory, an external memory, or a combination thereof. For example, the first storage unit 314 can be a nonvolatile storage such as non-volatile random access memory (NVRAM), Flash memory, disk storage, or a volatile storage such as static random access memory (SRAM).

The first storage unit 314 can include a first storage interface 324. The first storage interface 324 can be used for communication between and other functional units in the first device 102. The first storage interface 324 can also be used for communication that is external to the first device 102.

The first storage interface 324 can receive information from the other functional units or from external sources, or can transmit information to the other functional units or to external destinations. The external sources and the external destinations refer to sources and destinations external to the first device 102.

The first storage interface 324 can include different implementations depending on which functional units or external units are being interfaced with the first storage unit 314. The first storage interface 324 can be implemented with technologies and techniques similar to the implementation of the first control interface 322.

The first communication unit 316 can enable external communication to and from the first device 102. For example, the first communication unit 316 can permit the first device 102 to communicate with the second device 106 of FIG. 1, an attachment, such as a peripheral device or a computer desktop, and the communication path 104.

The first communication unit 316 can also function as a communication hub allowing the first device 102 to function as part of the communication path 104 and not limited to be an end point or terminal unit to the communication path 104. The first communication unit 316 can include active and passive components, such as microelectronics or an antenna, for interaction with the communication path 104.

The first communication unit 316 can include a first communication interface 328. The first communication interface 328 can be used for communication between the first communication unit 316 and other functional units in the first device 102. The first communication interface 328 can receive information from the other functional units or can transmit information to the other functional units.

The first communication interface 328 can include different implementations depending on which functional units are being interfaced with the first communication unit 316. The first communication interface 328 can be implemented with technologies and techniques similar to the implementation of the first control interface 322.

The first user interface 318 allows a user (not shown) to interface and interact with the first device 102. The first user interface 318 can include an input device and an output device. Examples of the input device of the first user interface 318 can include a keypad, a touchpad, soft-keys, a keyboard, a microphone, an infrared sensor for receiving remote signals, or any combination thereof to provide data and communication inputs.

The first user interface 318 can include a first display interface 330. The first display interface 330 can include a display, a projector, a video screen, a speaker, or any combination thereof.

The first control unit 312 can operate the first user interface 318 to display information generated by the navigation system 100. The first control unit 312 can also execute the first software 326 for the other functions of the navigation system 100. The first control unit 312 can further execute the first software 326 for interaction with the communication path 104 via the first communication unit 316.

The second device 106 can be optimized for implementing an embodiment of the present invention in a multiple device embodiment with the first device 102. The second device 106 can provide the additional or higher performance processing power compared to the first device 102. The second device 106 can include a second control unit 334, a second communication unit 336, and a second user interface 338.

The second user interface 338 allows a user (not shown) to interface and interact with the second device 106. The second user interface 338 can include an input device and an output device. Examples of the input device of the second user interface 338 can include a keypad, a touchpad, soft-keys, a keyboard, a microphone, or any combination thereof to provide data and communication inputs. Examples of the output device of the second user interface 338 can include a second display interface 340. The second display interface 340 can include a display, a projector, a video screen, a speaker, or any combination thereof.

The second control unit 334 can execute a second software 342 to provide the intelligence of the second device 106 of the navigation system 100. The second software 342 can operate in conjunction with the first software 326. The second control unit 334 can provide additional performance compared to the first control unit 312.

The second control unit 334 can operate the second user interface 338 to display information. The second control unit 334 can also execute the second software 342 for the other functions of the navigation system 100, including operating the second communication unit 336 to communicate with the first device 102 over the communication path 104.

The second control unit 334 can be implemented in a number of different manners. For example, the second control unit 334 can be a processor, an embedded processor, a microprocessor, hardware control logic, a hardware finite state machine (FSM), a digital signal processor (DSP), or a combination thereof.

The second control unit 334 can include a second controller interface 344. The second controller interface 344 can be used for communication between the second control unit 334 and other functional units in the second device 106. The second controller interface 344 can also be used for communication that is external to the second device 106.

The second controller interface 344 can receive information from the other functional units or from external sources, or can transmit information to the other functional units or to external destinations. The external sources and the external destinations refer to sources and destinations external to the second device 106.

The second controller interface 344 can be implemented in different ways and can include different implementations depending on which functional units or external units are being interfaced with the second controller interface 344. For example, the second controller interface 344 can be implemented with a pressure sensor, an inertial sensor, a microelectromechanical system (MEMS), optical circuitry, waveguides, wireless circuitry, wireline circuitry, or a combination thereof.

A second storage unit 346 can store the second software 342. The second storage unit 346 can also store the information for generating the interface map 218 of FIG. 2. The second storage unit 346 can be sized to provide the additional storage capacity to supplement the first storage unit 314.

For illustrative purposes, the second storage unit 346 is shown as a single element, although it is understood that the second storage unit 346 can be a distribution of storage elements. Also for illustrative purposes, the navigation system 100 is shown with the second storage unit 346 as a single hierarchy storage system, although it is understood that the navigation system 100 can have the second storage unit 346 in a different configuration. For example, the second storage unit 346 can be formed with different storage technologies forming a memory hierarchal system including different levels of caching, main memory, rotating media, or off-line storage.

The second storage unit 346 can be a volatile memory, a nonvolatile memory, an internal memory, an external memory, or a combination thereof. For example, the second storage unit 346 can be a nonvolatile storage such as non-volatile random access memory (NVRAM), Flash memory, disk storage, or a volatile storage such as static random access memory (SRAM).

The second storage unit 346 can include a second storage interface 348. The second storage interface 348 can be used for communication between other functional units in the second device 106. The second storage interface 348 can also be used for communication that is external to the second device 106.

The second storage interface 348 can receive information from the other functional units or from external sources, or can transmit information to the other functional units or to external destinations. The external sources and the external destinations refer to sources and destinations external to the second device 106.

The second storage interface 348 can include different implementations depending on which functional units or external units are being interfaced with the second storage unit 346.

The second storage interface 348 can be implemented with technologies and techniques similar to the implementation of the second controller interface 344.

The second communication unit 336 can enable external communication to and from the second device 106. For example, the second communication unit 336 can permit the second device 106 to communicate with the first device 102 over the communication path 104.

The second communication unit 336 can also function as a communication hub allowing the second device 106 to function as part of the communication path 104 and not limited to be an end point or terminal unit to the communication path 104. The second communication unit 336 can include active and passive components, such as microelectronics or an antenna, for interaction with the communication path 104.

The second communication unit 336 can include a second communication interface 350. The second communication interface 350 can be used for communication between the second communication unit 336 and other functional units in the second device 106. The second communication interface 350 can receive information from the other functional units or can transmit information to the other functional units.

The second communication interface 350 can include different implementations depending on which functional units are being interfaced with the second communication unit 336. The second communication interface 350 can be implemented with technologies and techniques similar to the implementation of the second controller interface 344.

The first communication unit 316 can couple with the communication path 104 to send information to the second device 106 in the first device transmission 308. The second device 106 can receive information in the second communication unit 336 from the first device transmission 308 of the communication path 104.

The second communication unit 336 can couple with the communication path 104 to send information to the first device 102 in the second device transmission 310. The first device 102 can receive information in the first communication unit 316 from the second device transmission 310 of the communication path 104. The navigation system 100 can be executed by the first control unit 312, the second control unit 334, or a combination thereof. For illustrative purposes, the second device 106 is shown with the partition having the second user interface 338, the second storage unit 346, the second control unit 334, and the second communication unit 336, although it is understood that the second device 106 can have a different partition. For example, the second software 342 can be partitioned differently such that some or all of its function can be in the second control unit 334 and the second communication unit 336. Also, the second device 106 can include other functional units not shown in FIG. 3 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100.

Figure 4:
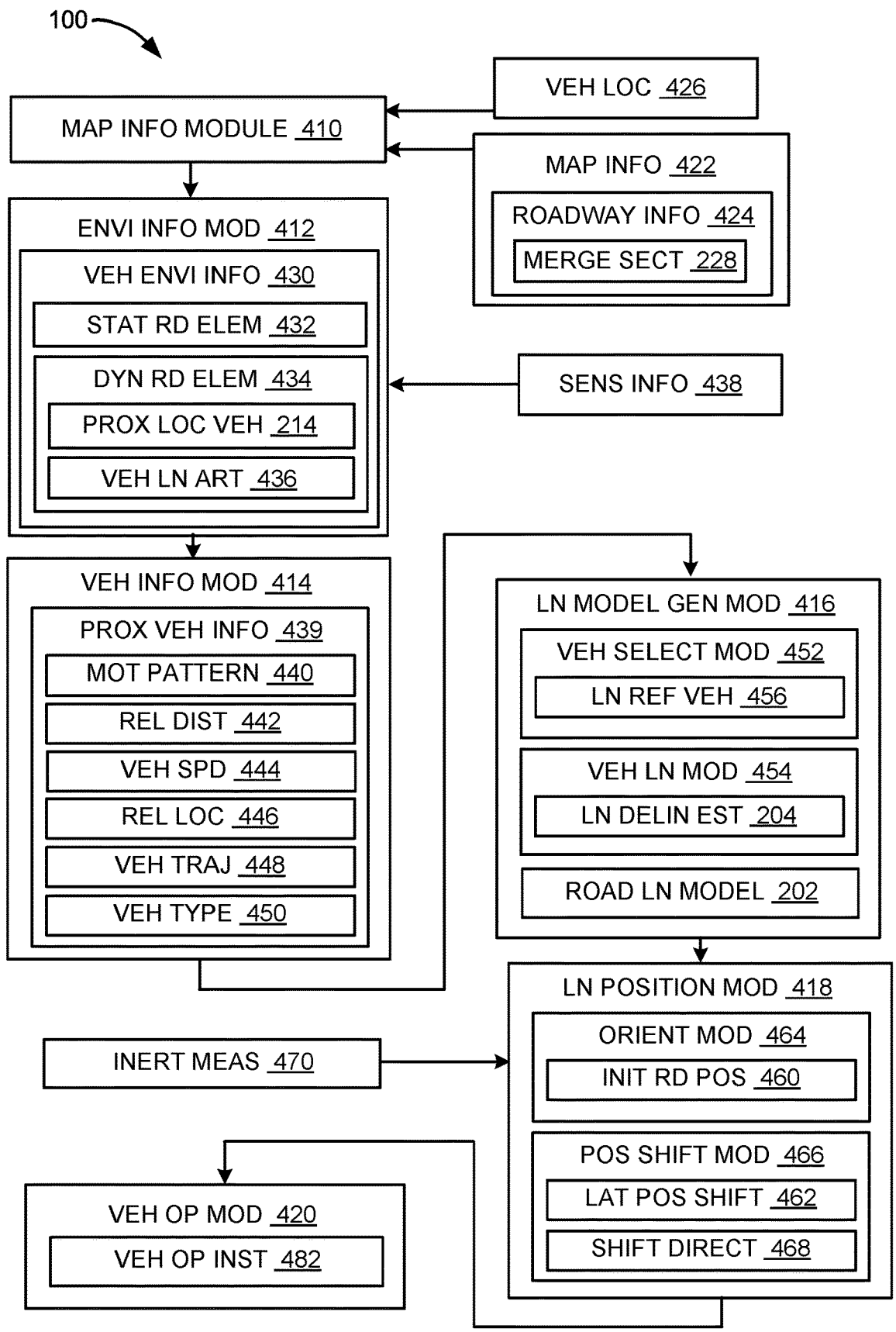
FIG. 4 is a control flow of the navigation system.

Referring now to FIG. 4, therein is shown a control flow of the navigation system 100. The control flow can be for generating the road lane model 202 and determining the lane position 208 of the user vehicle 212, which will be described below. The navigation system 100 can include a map information module 410, an environment information module 412, a vehicle information module 414, a lane model generation module 416, a lane position module 418, and a vehicle operation module 420. The environment information module 412 can be coupled to the map information module 410. The vehicle information module 414 can be coupled to the environment information module 412. The lane generation module 416 can be coupled to vehicle information module 414. The lane position module 418 can be coupled to the lane generation module 416. The vehicle operation module 420 can be coupled to the lane position module 418.

The map information module 410 is for receiving map information 422 corresponding to the position of the user vehicle 212 of FIG. 2. The map information 422 is information representing a geographic area. For example, the map information 422 can include information about travel infrastructure, such as roads and highways; specific location information, such as building addresses; geographic features, such as terrain, bodies of water, and topography; or a combination thereof. As a specific example, the map information 422 can include roadway information 424. The roadway information 424 are details about a particular roadway. For example, the roadway information 424 can be information about the current roadway 206 of FIG. 2. The roadway information 424 can include information, such as a lane count for the current roadway 206, which is a count of the number of lanes, an estimated width of the lanes, the existence and width of a road shoulder area, a total estimated width of the roadway, a speed limit, or a combination thereof. In another specific example, the map information 422 can include information of related roadways, such as intersections with the current roadway 206, including merge section information such as the location and length of the lane merge section 228 of FIG. 2.

The map information module 410 can utilize a user vehicle location 426, which is the geographic or physical location of the user vehicle 212, to determine the map information 422. For example, the map information module 410 can interface with the location unit 320 of FIG. 3 of the first device 102 to determine the user vehicle location 422, such as the GPS coordinates or the longitude and latitude of the user vehicle 212. To continue the example, the map information module 410 can utilize the user vehicle location 426 to get the map information 422 for the geographic area around the user vehicle 212.

The map information module 410 can receive the map information 422 from various sources. For example, the map information module 410 can receive the map information 422 stored in the first storage unit 314 of FIG. 3 of the first device 102. In another example, the map information module 410 can receive the map information 422 from a device other than the first device 102, such as an external storage unit or server, the second storage unit 342 of FIG. 3, or a combination thereof.

The control flow can pass to the environment information module 412. The environment information module 412 is for collecting information about the environment around the user vehicle 212. For example, the environment information module 412 can collect vehicle environment information 430, which is information regarding objects surrounding the user vehicle 212. For example, the vehicle environment information 430 can be information about a vehicle environment, which is the environment external to and surrounding the vehicle, and can include information about static road elements 432, dynamic road elements 434, or a combination thereof.

The static road elements 432 are fixed objects at a static location within the environment around the user vehicle 212. For example, the static road elements 432 can be objects that are fixed or unlikely to change position over the passage of time. As a specific example, the static road elements 432 can be specific to the current roadway 206, such lane markings, sign posts, road barriers, pylons, trees, or buildings.

The dynamic road elements 434 are objects that change within the environment around user vehicle 212. The dynamic road elements 434 can be objects that are in motion or are temporary within the vehicle environment. For example, the dynamic road elements 434 can include the proximately located vehicles 214, vehicle lane artifacts 436, or a combination thereof.

The vehicle lane artifacts 436 are markings or impressions in temporary coverings on the surface of the current roadway 206. For example, the vehicle lane artifacts 436 can tire tracks in temporary road coverings, such as mud or snow. As another example, the vehicle lane artifacts 436 can be shovel or scrap marks in snow or ice from a snow or ice removal vehicle, such as a snow plow, or in mud from a debris clearing vehicle.

The environment information module 412 can collect the vehicle environment information 430 in a number of ways. In one implementation, the vehicle environment information 430 can be information received through communication or interfacing with other vehicles; information accumulated from sensors or detection instruments; information received from other sources external to the user vehicle 212 or the first device 102, such as a computer server or network; or a combination thereof. More specifically, the first control unit 312 can implement the first communication unit 316 with the environment information module 412 to communicate with devices external to the first device 102, such a communication unit of surrounding vehicles or a traffic server.

In another implementation, the environment information module 412 can collect the vehicle environment information 430 as sensor information 438. For example, the environment information module 412 can collect the vehicle environment information 430 by sending commands or requests to a sensor unit to take various readings, which can be transmitted back to the environment information module 412 as the sensor information 438.

The sensor unit can be a device that includes sensors and detection instruments. For example, the sensor unit can include one or more instruments or sensors, such as a camera, a microphone, an infrared detector, a radar detector, a LIDAR unit, an inertial measurement unit (IMU), or a combination thereof. The sensor unit can include instruments and sensors attached to or integrated with the user vehicle 212 or external to the user vehicle 212, such as sensors or instruments mounted on the side of the road. In an implementation, the sensor unit can be a part of or coupled to the first device 102, the second device 106, or a combination thereof. As an example, the sensor unit can include multiple instances of a sensor type integrated with or mounted at different locations in or on the user vehicle 212. In a specific example, multiple instances of a high accuracy IMU, such as an "Xsens MTI 710" IMU, can be located at different points around the user vehicle 212 to provide the sensor information 438 that is more precise or accurate relative to IMUs that are integrated with mobile devices, such as mobile phones or the first device 102.

The sensor information 438 can be information recorded or measured by sensors or instruments, such as the sensor unit, about the area or environment surrounding the user vehicle 212. The vehicle environment information 430, including the sensor information 438, can include various types of information regarding objects surrounding the user vehicle 212 and can be provided in a number of different formats and states. The format of the vehicle environment information 430 can be based on the source of the vehicle environment information 430. For example, the state of the vehicle environment information 430 can be raw or unprocessed information, such as raw signals or images, partially processed information, or processed information. More specifically, the sensor information 438 can be raw or unprocessed information or partially processed information sensor readings measured or recorded by the sensor unit.

The control flow can pass to the vehicle information module 414. The vehicle information module 414 is for determining the proximate vehicle information 439 for the proximately located vehicles 214. More specifically, the vehicle information module 414 can determine the proximate vehicle information 439 from the vehicle environment information 430.

For example, the vehicle information module 414 can determine the proximate vehicle information 439 from the vehicle environment information 430 for one or more instances of the proximately located vehicles 214. As a specific example, the vehicle information module 414 can identify patterns in the vehicle environment information 430 that are recognized as a vehicle, such as heat signatures, noise, sounds, vibrations, illumination, emissions, movement heading, speed, acceleration, deceleration, movement patterns, physical location, position, shape, size, or any combination thereof. As another specific example, the vehicle information module 414 can compare or corroborate information between different types or sources of the vehicle environment information 430 such as different instances or types of the sensor units. To continue the specific example, the vehicle information module 414 can compare, corroborate, cross-verify or a combination thereof the vehicle environment information 430 based on the sensor information 438 from an infrared sensor for heat signatures, a LIDAR unit, microphones, cameras, pressure sensors, or other types of the sensor units to determine the proximate vehicle information 439.

In a further example, the vehicle information module 414 can calculate a relative distance 442, a vehicle speed 444, a vehicle trajectory 448, or a combination thereof for the proximately located vehicles 214 based on the vehicle environment information 430. As a specific example, the vehicle information module 414 can calculate the vehicle speed 236 and the vehicle trajectory 448 based on changes and the rate of changes in a relative location 446, a relative distance 442, or a combination thereof over a specific period of time.

The vehicle information module 414 can analyze the proximate vehicle information 439 to determine a motion pattern 440 of the proximately located vehicles 214. The motion pattern 440 is a pattern of movement or maneuvering of a vehicle over a period of time. For example, the motion pattern 440 can be swerving motion 230 of FIG. 2, steady or continuous trajectory motion 232 of FIG. 2, or a turning motion 234 of FIG. 2.

The vehicle information module 414 can determine the motion pattern 440 of the proximately located vehicles 214 based on the proximate vehicle information 439. For example, the vehicle information module 414 can determine the motion pattern 440 based on changes in the vehicle speed 236, the acceleration indicator 240, the vehicle heading 238, or a combination thereof.

The vehicle type 450 is a general category or classification of a vehicle. For example, the vehicle type 450 can be general category of vehicle such as a bicycle, a motorized scooter, a motorcycle, a car, truck, a sport utility vehicle, a van, a bus, a recreational camper vehicle, a tractor trailer, a snow removal vehicle, or a construction vehicle. To further the example, the vehicle type 450 can include specific classifications, such as emergency vehicles, which can be further distinguished as police vehicles, fire fighting vehicles, or medical response vehicles. The vehicle information module 414 can, for example, determine the vehicle type 450 based on the shape, size, profile, or a combination thereof for the proximately located vehicles 214.

The control flow can pass to the lane model generation module 416. The lane model generation module 416 is for generating the road lane model 202. The lane model generation module 416 can generate the road lane model 202 as a localized model relative to the vehicle location 426 of the user vehicle 212. In general, the lane model generation module 416 can generate the road lane model 202 as a combination of the map information 422 and the vehicle environment information 430, both corresponding to the vehicle location 426 of the user vehicle 212.

In an implementation, the lane model generation module 416 can generate the lane delineation estimations 204 of the road lane model 202 based on the map information 422 and the static road elements 432 of the vehicle environment information 430. For example, the lane model generation module 416 can use the roadway information 424, such as the lane count of the roadway lanes, the roadway lane width, the total roadway width, or a combination thereof, as baseline or template for boundaries of the lane delineation estimations 204. To continue the example, the lane model generation module 416 can verify the position or alignment of the lane delineation estimations 204 baseline from the roadway information 424 in real time with the static road elements 432. As a specific example the lane model generation module 416 can use the static road elements 432, such as the traffic barriers or dividers, the lane markings, raised pavement markers, reflective lane markers, or a combination thereof to determine the location of the various elements of the roadway information 424. To continue the specific example, the lane model generation 416 can use the static road elements 423 based on physical features of the roadway including gaps or edges between concrete or paved segments; metallic rails for trolleys or cable cars that embedded or integrated with the road way; changes in or transitions between the road surface such as from an asphalt, concrete, or paved surface to a gravel or unpaved surface which generally exist along the edge of a roadway; or a combination thereof.

In certain situations, the map information 422 cannot be verified due to unreliability of the static road elements 432, which will be referred to hereinafter as unverifiable situations. Examples of the unverifiable situations can occur when the static road elements 432 are obscured due to weather related phenomenon, such as snow, ice, flood waters, or mud. In another example, unverifiable situations can occur when the static road elements 432 are unreliable as a reference for road lane model 202, such as when the flow of traffic deviates or is redirected from static road elements 432, such as established lane markers, due for construction or road work, obstacles such as a stalled vehicle or debris in the roadway, or due to emergency vehicles in the case of an accident.

In the unverifiable situations, the lane model generation module 416 can generate the road lane model 202 in the absence of or contrary to the static road elements 432. For example, the lane model generation module 416 can generate the road lane model 202 based on the dynamic road elements 434. As a specific example, the lane model generation module 416 can generate the road lane model 202 based on lane reference vehicles 456. The lane reference vehicles 456 are a subset of the proximately located vehicles 214 that act as reference points for determining the lane delineation estimations 204.

The lane model generation module 416 can determine the lane reference vehicles 456 with a vehicle selection module 452. The vehicle selection module 452 can select the lane reference vehicles 456 from the proximately located vehicles 214. For example, the vehicle selection module 452 can select the lane reference vehicles 456 based on the vehicle type 450 of the proximately located vehicles 214, the motion pattern 440 of the proximately located vehicles 214, or a combination thereof. As a specific example, the vehicle selection module 452 can select the lane reference vehicles 456 by excluding instances of the proximately located vehicles 214 of a specific instance of the vehicle type 450, such as motorcycles. In another example, the vehicle selection module 452 can select the lane reference vehicles 456 based on the motion pattern 440 of a single instance of the proximately located vehicles 214 deviating from other instances of the proximately located vehicles 214. As a specific example, the vehicle selection module 452 can select the lane reference vehicles 456 by excluding instances of the proximately located vehicles 214 indicating or engaging in particular types of the motion pattern 440, such as the proximately located vehicles 214 engaged in the swerving motion 230, blinker lights indicating a pending lane change maneuver or the motion pattern 440 of lateral shift in the vehicle positon indicating a change in lanes, which deviates from other instances of the proximately located vehicles 214 with the vehicle trajectory 448 that is straight or engaged in the continuous trajectory motion 232. In yet a further example the vehicle selection module 452 can select the lane reference vehicles 456 by excluding the proximately located vehicles 214 that are traveling in the opposite direction of traffic relative to the user vehicle 212.

The lane model generation module 416 can generate the road lane model 202 based on the dynamic road elements 434 with a vehicle lane module 454. As an example, the vehicle lane module 454 can calculate the lane delineation estimations 204 of the road lane model 202 with the proximate vehicle information 439 of the lane reference vehicles 456. As a specific example, the vehicle lane module 454 can analyze the motion pattern 440 and relative location 446 of the lane reference vehicles 456 to calculate the lane delineation estimations 204.

In one implementation, the vehicle lane module 454 can generate the road lane model 202 based on multiple instances of the lane reference vehicles 456. For example, the lane model generation module 416 can generate the lane delineation estimations 204 based on an average of the vehicle orientation of the lane reference vehicles 456, the vehicle trajectory 448 of lane reference vehicles 456, or a combination thereof. To continue the example, the vehicle lane module 454 can calculate the lane delineation estimations 204 as a distance or width from centerline of the average trajectory of the group of the lane reference vehicles 456.

In another implementation, the vehicle lane module 454 can generate the road lane model 202 with the lane delineation estimations 204 based on the proximate vehicle information 439 of a single instance of the lane reference vehicles 456. For example, the vehicle lane module 454 can calculate the lane delineation estimations 204 based on the relative location 446 and vehicle trajectory 448 of the lane reference vehicles 456 ahead of or leading the user vehicle 212. As another example, the vehicle lane module 454 can calculate the lane delineation estimations 204 based on the vehicle type 450, such as an emergency vehicle or a snow removal vehicle. As a specific example, in the case of snow, ice, mud, or a combination thereof obscuring the static road elements 432, the vehicle lane module 454 can calculate the lane delineation estimations 204 based on the lane reference vehicle 456 with the vehicle type 450 as snow removal vehicles. More specifically, since the snow removal vehicles travel near the edges or outer boundaries of the roadway, the vehicle lane module 454 can use the relative location 446, the relative trajectory 448, or a combination thereof to calculate the lane delineation estimations 204.

In the absence or inability to use the lane reference vehicle 456, the vehicle lane module 454 can generate the road lane model 202 based on the vehicle lane artifacts 436. For example, the vehicle lane module 454 can use the vehicle lane artifacts 436 as a reference to calculate the lane delineation estimations 204. In a specific example of snow causing the static road elements 432 to be obscured, the vehicle lane module 454 can calculate the lane delineation estimations 204 as a particular width and course that follows the vehicle lane artifacts 436 of tire tracks in the snow or mud on the current roadway 206, which can be used in combination or verified with the map information 422.

The control flow can pass to the lane position module 418. The lane position module 418 is for calculating the lane position 208 of the user vehicle 212. As an example, the lane position module 418 can calculate the lane position 208 of the user vehicle 212 on the current roadway 206 based on an initial roadway position 460 and a lateral position shift 462 of the user vehicle 212. The lateral position shift 462 is a shift in position of the user vehicle that is perpendicular to the axis of travel of the user vehicle 212.

The initial roadway position 460 is the initial location of the user vehicle 212 upon entry of the user vehicle 212 on a roadway. For example, the initial roadway position 460 of the user vehicle 212 can be the vehicle location 426 of the user vehicle 212 upon entry of the user vehicle 212 onto the current roadway 206, such as after transitioning from an on-ramp, a street, or parking area onto the current roadway 206.

The lane position module 418 can determine the initial roadway position 460 of the user vehicle 212 with an orientation module 464. The orientation module 464 can determine the initial roadway position 460 based on the user vehicle location 422, the map information 422, or a combination thereof. For example, the orientation module 464 can monitor the user vehicle location 422 relative to the map information 422 to determine when the user vehicle 212 has transitioned on to the current roadway 206. To continue the example, the initial roadway position 460 can be determined over a post-transition distance following entry onto the current roadway 206, such as on the lane merge section 228. As a specific example, the post-transition distance can be a distance of 10 to 20 meters from the point of entry onto the current roadway 206, since vehicles tend to travel in the initial lane of entry over a short distance before engaging in further lane change maneuvers.

The orientation module 464 can determine the initial roadway position 460 based on the entry location to the current roadway 206. For example, the initial roadway position 460 can be on the right side of the current roadway 206 when the entry location is on the right side of the current roadway 206 and on the left side of the current roadway 206 when the entry location is on the left side of the current roadway 206.

The lane position module 418 can determine the lateral position shift 462 for the user vehicle 212 with the position shift module 466. The position shift module 466 can determine the lateral position shift 462 based on the force and duration of lateral movement corresponding to a distance of the lane width for the lane delineation estimations 204 of the road lane model 202. As an example, the position shift module 466 can receive an inertial measurement 470 from inertial measurement unit to determine the lateral position shift 462.

The position shift module 466 can include a determination of a shift direction 468 associated with the lateral position shift 462. The shift direction 468 is the lateral direction in which the lateral position shift 462 occurred. As an example, the shift direction 468 can be based on the inertial measurement 470 from the inertial measurement unit.

The lane position module 418 can calculate the lane position 208 of the user vehicle 212 relative to the initial roadway position 460 of the user vehicle 212. For example, the lane position module 418 can calculate the lane position 208 relative to initial roadway position 460 according to the number of lateral position shift 462 and the associated shift direction 468. To continue the example, the lane position module 418 can correlate each instance of the lateral position shift 462 and associated shift direction 468 to the lane delineation estimations 204 of the road lane model 202. In another example, in the case that the current roadway 206 includes a curve or bend, the lane position module 418 can determine the change in the lane position 208 according the lack of the lateral position shift 462 or a reduced amount of the lateral position shift 462, according to the degree of the curvature for the current roadway 206, relative to the degree of the lateral position shift 462 that would occur during the change in the lane position 208 on a straight section.

The navigation system 100 can implement the road lane model 202, the lane position 208, or a combination thereof for operation of the user vehicle 212 with the vehicle operation module 420. The vehicle operation module 420 is for generating vehicle operation instructions 480. The vehicle operation instructions 480 can be commands to manipulate mechanical and electronic systems in the user vehicle 212 in order to execute driving maneuvers, such as distance control, speed control, acceleration, braking, or turning. For example, the instruction generation module 418 can generate the vehicle operation instructions 480 to control essential vehicle control functions of the user vehicle 212, such as a throttling system, a steering system, a braking system, or a combination thereof.

The vehicle operation instructions 480 can be instructions for autonomous operation of the user vehicle 212. During autonomous operation of the user vehicle 212, autonomous vehicle operation system can control one or more essential vehicle control functions of the user vehicle 212 with partial or no intervention or actions by the system user of the user vehicle 212.

The vehicle operation module 420 can generate the vehicle operation instructions 480 based on the road lane model 202 during autonomous operation of the user vehicle 212. For example, the vehicle operation instructions 480 can direct the autonomous vehicle operation system to maintain or change the lane position 208 based the lane delineation estimations 204.

It has been discovered that the navigation system 100 provides improved operation safety of the user vehicle 212. The navigation interface 216 can provide the road lane model 202 with the lane delineation estimations 204 that are accurate, dynamic, or a combination thereof based on the static road elements 432, the dynamic road elements 434, or a combination thereof, which provides that account for the changes in the environment around the user vehicle 212, which improves safety in operating the user vehicle 212.

The navigation system 100 has been described with module functions or order as an example. The navigation system 100 can partition the modules differently or order the modules differently. For example, the map information module 410 can be coupled to the lane model generation module 416.

For illustrative purposes, the various modules have been described as being specific to the first device 102 or the second device 106. However, it is understood that the modules can be distributed differently. For example, the various modules can be implemented in a different device, or the functionalities of the modules can be distributed across multiple devices. Also as an example, the various modules can be stored in a non-transitory memory medium.

As a more specific example, one or more modules described above can be stored in the non-transitory memory medium for distribution to a different system, a different device, a different user, or a combination thereof, for manufacturing, or a combination thereof. Also as a more specific example, the modules described above can be implemented or stored using a single hardware unit, such as a chip or a processor, or across multiple hardware units.

The modules described in this application can be hardware implementation or hardware accelerators in the first control unit 316 of FIG. 3 or in the second control unit 338 of FIG. 3. The modules can also be hardware implementation or hardware accelerators within the first device 102 or the second device 106 but outside of the first control unit 316 or the second control unit 338, respectively, as depicted in FIG. 3. However, it is understood that the first control unit 316, the second control unit 338, or a combination thereof can collectively refer to all hardware accelerators for the modules.

The modules described in this application can be implemented as instructions stored on a non-transitory computer readable medium to be executed by a first control unit 312, the second control unit 336, or a combination thereof. The non-transitory computer medium can include the first storage unit 314 of FIG. 3, the second storage unit 346 of FIG. 3, or a combination thereof. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the navigation system 100 or installed as a removable portion of the navigation system 100.

The physical transformation from determining the lane position 208 of the user vehicle 212 results in the movement in the physical world, such as maneuvering the user vehicle 212 based on the lane delineation estimations 204. Movement in the physical world, such movement of the proximately located vehicles 214, results in changes to the road lane model 202 by updating the lane delineation estimations 204.

Figure 5:
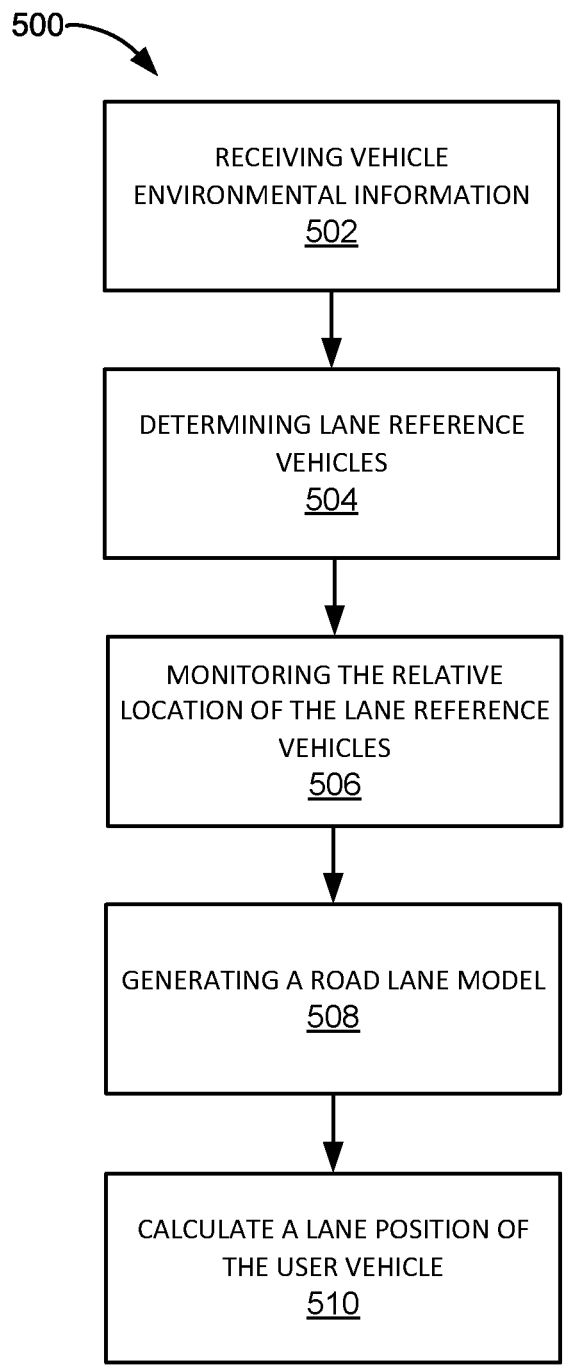
FIG. 5 is a flow chart of a method of operation of a navigation system in an embodiment of the present invention.

Referring now to FIG. 5, therein is shown a flow chart of a method 500 of operation of a navigation system 100 in an embodiment of the present invention. The method 500 includes: receiving vehicle environment information of a user vehicle, the vehicle environment information including proximate vehicle information representing proximately located vehicles relative to the user vehicle in a block 502; determining lane reference vehicles from the proximately located vehicles based on a vehicle type of the proximately located vehicles in a block 504; monitoring the relative position of the lane reference vehicles in a block 506; generating a road lane model including a lane delineation estimation based on the relative position of the lane reference vehicles 508; and calculating a lane position of the user vehicle according to the lane delineation estimation based on a lateral position shift of the user vehicle in a block 510.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A navigation system comprising:
a communication unit including microelectronics configured to receive vehicle environment information of a user vehicle, the vehicle environment information including proximate vehicle information representing proximately located vehicles relative to the user vehicle; and
a control unit including a processor, coupled to the communication unit, configured to:
determine lane reference vehicles from the proximately located vehicles based on a vehicle type, which is general category or classification based on a shape, a size, and a profile, and a motion pattern, which is maneuvering of a vehicle over a period of time, of the proximately located vehicles;
monitor a relative location of the lane reference vehicles;
generate a road lane model including a lane delineation estimation based on the relative location of the lane reference vehicles;
calculate a lane position of the user vehicle according to the lane delineation estimation based on a lateral position shift of the user vehicle; and
operate the user vehicle to maintain or change the lane position according to the road lane model based on the lane reference vehicles during autonomous operation of the user vehicle.

2. The navigation system as claimed in claim 1 wherein the control unit is configured to:
determine an initial roadway position of the user vehicle upon entry of the user vehicle onto a current roadway; and
calculate the lane position of the user vehicle based on the lateral position shift of the user vehicle relative to the initial roadway position.

3. The navigation system as claimed in claim 1 wherein the control unit is configured to:
identify a vehicle lane artifact from the vehicle environment information; and
generate the road lane model based on the vehicle lane artifact.

4. The navigation system as claimed in claim 1 wherein the control unit is configured to:
identify a static roadway element from the vehicle environment information; and
generate the road lane model based on the static roadway element.

5. The navigation system as claimed in claim 1 wherein the control unit is configured to generate the road lane model based on map information.

6. The navigation system as claimed in claim 1 wherein the control unit is configured to calculate the lateral position shift from an inertial measurement received from an inertial measurement unit integrated with the user vehicle.

7. The navigation system as claimed in claim 1 wherein the control unit is configured to generate the road lane model during autonomous operation of the user vehicle.

8. A method of operation of a navigation system comprising:
receiving vehicle environment information of a user vehicle, the vehicle environment information including proximate vehicle information representing proximately located vehicles relative to the user vehicle;
determining lane reference vehicles from the proximately located vehicles based on a vehicle type, which is general category or classification based on a shape, a size, and a profile, and a motion pattern, which is maneuvering of a vehicle over a period of time, of the proximately located vehicles;
monitoring a relative location of the lane reference vehicles;
generating a road lane model including a lane delineation estimation based on the relative location of the lane reference vehicles;
calculating a lane position of the user vehicle according to the lane delineation estimation based on a lateral position shift of the user vehicle; and
operating the user vehicle to maintain or change the lane position according to the road lane model based on the lane reference vehicles during autonomous operation of the user vehicle.

9. The method as claimed in claim 8 further comprising:
determining an initial roadway position of the user vehicle upon entry of the user vehicle onto a current roadway; and
calculating the lane position of the user vehicle based on the lateral position shift of the user vehicle relative to the initial roadway position.

10. The method as claimed in claim 8 further comprising:
identifying a vehicle lane artifact from the vehicle environment information; and
wherein:
generating the road lane model includes generating the road lane model based on the vehicle lane artifact.

11. The method as claimed in claim 8 further comprising:
identifying a static roadway element from the vehicle environment information; and wherein:
generating the road lane model includes generating the road lane model based on the static roadway element.

12. The method as claimed in claim 8 wherein generating the road lane model includes generating the road lane model based on map information.

13. The method as claimed in claim 8 further comprising calculating the lateral position shift from an inertial measurement received from an inertial measurement unit integrated with the user vehicle.

14. The method as claimed in claim 8 wherein generating the road lane model includes generating the road lane model during autonomous operation of the user vehicle.

15. A non-transitory computer readable medium including instructions executable by a control circuit for a navigation system, the instructions comprising:
receiving vehicle environment information of a user vehicle, the vehicle environment information including proximate vehicle information representing proximately located vehicles relative to the user vehicle;
determining lane reference vehicles from the proximately located vehicles based on a vehicle type, which is general category or classification based on a shape, a size, and a profile, and a motion pattern, which is maneuvering of a vehicle over a period of time, of the proximately located vehicles;
monitoring a relative location of the lane reference vehicles;
generating a road lane model including a lane delineation estimation based on the relative location of the lane reference vehicles;
calculating a lane position of the user vehicle according to the lane delineation estimation based on a lateral position shift of the user vehicle; and
operating the user vehicle to maintain or change the lane position according to the road lane model based on the lane reference vehicles during autonomous operation of the user vehicle.

16. The non-transitory computer readable medium as claimed in claim 15, wherein the instructions include:
determining an initial roadway position of the user vehicle upon entry of the user vehicle onto a current roadway; and
calculating the lane position of the user vehicle based on the lateral position shift of the user vehicle relative to the initial roadway position.

17. The non-transitory computer readable medium as claimed in claim 15, wherein the instructions include:
identifying a vehicle lane artifact from the vehicle environment information; and
generating the road lane model includes generating the road lane model based on the vehicle lane artifact.

18. The non-transitory computer readable medium as claimed in claim 15, wherein the instructions include:
identifying a static roadway element from the vehicle environment information; and
generating the road lane model includes generating the road lane model based on the static roadway element.

19. The non-transitory computer readable medium as claimed in claim 15, wherein the instructions include calculating the lateral position shift from an inertial measurement received from an inertial measurement unit integrated with the user vehicle.

20. The non-transitory computer readable medium as claimed in claim 15, wherein the instructions include generating the road lane model includes generating the road lane model during autonomous operation of the user vehicle.

\* \* \* \* \*